United States Patent
Zhou et al.

(10) Patent No.: US 9,613,452 B2
(45) Date of Patent: Apr. 4, 2017

(54) METHOD AND SYSTEM FOR VOLUME RENDERING BASED 3D IMAGE FILTERING AND REAL-TIME CINEMATIC RENDERING

(71) Applicant: Siemens Healthcare GmbH, Erlangen (DE)

(72) Inventors: Shaohua Kevin Zhou, Plainsboro, NJ (US); Klaus Engel, Nürnberg (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 79 days.

(21) Appl. No.: 14/641,471

(22) Filed: Mar. 9, 2015

(65) Prior Publication Data
US 2016/0267703 A1 Sep. 15, 2016

(51) Int. Cl.
G06T 15/08 (2011.01)
G06T 5/10 (2006.01)

(52) U.S. Cl.
CPC .................... *G06T 15/08* (2013.01)

(58) Field of Classification Search
None
See application file for complete search history.

(56) References Cited

U.S. PATENT DOCUMENTS

| | | |
|---|---|---|
| 7,154,500 B2 | 12/2006 | Heng et al. |
| 7,184,041 B2 | 2/2007 | Heng et al. |
| 7,330,578 B2 | 2/2008 | Wang et al. |
| 2006/0291710 A1 | 12/2006 | Wang et al. |
| 2008/0069422 A1 | 3/2008 | Wang et al. |
| 2012/0154400 A1 | 6/2012 | Steen |
| 2012/0299914 A1* | 11/2012 | Kilpatrick ............... G06T 15/50 345/420 |
| 2014/0309518 A1* | 10/2014 | Sung ................... A61B 5/7235 600/410 |

OTHER PUBLICATIONS

Levoy "Efficient Ray Tracing of Volume Data", ACM Transactions on Graphics, vol. 9 No. 3, Jul. 1990, pp. 245-261.*
Kroes et al. "Exposure Render: An Interactive Photo-Realistic Volume Rendering framework", PloS One, vol. 7 Issue 7 Jul. 2012.*

* cited by examiner

*Primary Examiner* — Yingchun He

(57) ABSTRACT

A method and apparatus for volume rendering based 3D image filtering and real-time cinematic volume rendering is disclosed. A set of 2D projection images of the 3D volume is generated using cinematic volume rendering. A reconstructed 3D volume is generated from the set of 2D projection images using an inverse linear volumetric ray tracing operator. The reconstructed 3D volume inherits noise suppression and structure enhancement from the projection images generated using cinematic rendering, and is thus non-linearly filtered. Real-time volume rendering can be performed on the reconstructed 3D volume using volumetric ray tracing, and each projected image of the reconstructed 3D volume is an approximation of a cinematic rendered image of the original volume.

23 Claims, 3 Drawing Sheets

METHOD AND SYSTEM FOR VOLUME RENDERING BASED 3D IMAGE FILTERING AND REAL-TIME CINEMATIC RENDERING

BACKGROUND OF THE INVENTION

The present invention relates to image filtering to reduce noise in an image, and more particularly, to 3D image filtering based on volume rendering to suppress noise and enhance structure of interest in a 3D image.

Image noise is inherent to any imaging device. Image noise in a volumetric image presents undesirable artifacts. Existing noise reduction and image enhancement methods do not totally solve this problem. Accordingly, better noise reduction and image enhancement algorithms are desirable.

Conventional noise reduction methods are mostly based on signal processing theories. A smoothing filter convolves the original image with a mask that represents a low-pass filter or smoothing operation. However, smoothing filters tend to blur the image. The anisotropic diffusion method solves a smoothing partial differential equation similar to a heat equation to remove noise without blurring the edges of the image. A median filter is an example of a non-linear filter and, if properly designed, is very good at preserving image detail. However, median filters work better for salt-and-pepper image noise.

BRIEF SUMMARY OF THE INVENTION

The present invention provides a method and system for volume rendering based 3D image filtering and real-time cinematic volume rendering. Embodiments of the present invention perform 3D image filtering path tracing based volume rendering to generate realistic, cinematic rendering effects.

In one embodiment of the present invention, a set of 2D projection images of the 3D volume is generated using cinematic volume rendering. A reconstructed 3D volume is generated from the set of 2D projection images using an inverse linear volumetric ray tracing operator.

These and other advantages of the invention will be apparent to those of ordinary skill in the art by reference to the following detailed description and the accompanying drawings.

DETAILED DESCRIPTION

Figure 1:
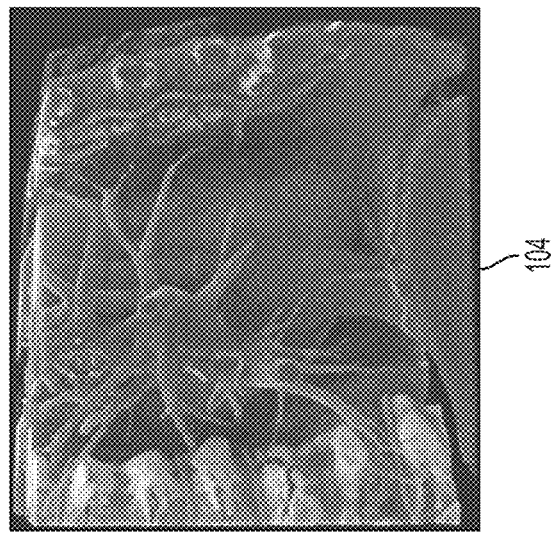
FIG. 1 shows a comparison a projected images generated using ray tracing volume rendering and cinematic volume rendering.
Figure 1:
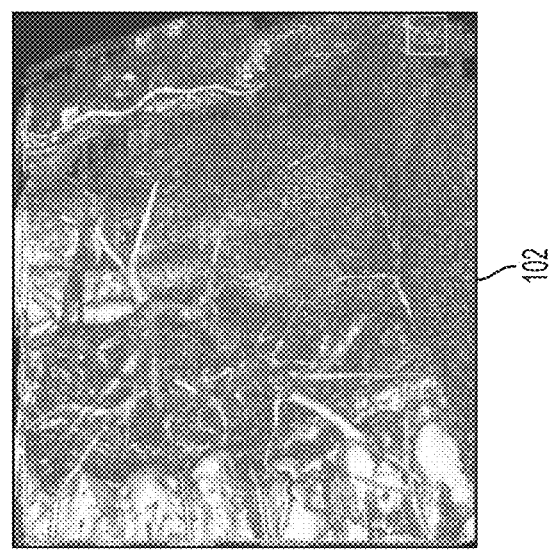

The present invention relates to a method and system for volume rendering based 3D image filtering and real-time cinematic volume rendering. Embodiments of the present invention are described herein to give a visual understanding of the image filtering and real-time cinematic volume rendering method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Volume rendering refers to techniques used to display a 2D projected image of a 3D volume. One type of volume rendering is based on volumetric ray tracing. Ray tracing volume rendering is performed by generating a ray for each pixel in the 2D projected image using a simple camera model. The ray is sampled at regular or adaptive intervals in throughout the 3D image volume. The volume data is interpolated at each sample point, a transfer function is applied at each sample point to form an RGBA (Red, Green, Blue, Alpha) sample, the sample is composited onto the accumulated RGBA of the ray, and the process is repeated for each sample point until the ray exits the volume. The accumulated RGBA of the ray is converted to an RGB color, which is deposited in the corresponding pixel of the 2D projected image. The 2D projected image is formed by repeating this process for every pixel of the 2D projected image. Volumetric ray tracing can be described by a linear projection operator $\Pi$ that operates on a 3D volume V, using a camera model with a parameter $\theta$, to generate a 2D image I, such that:

$$I = \Pi(V; \theta) \quad (1)$$

By varying the parameter $\theta$, different projection images $I(\theta)$ can be generated. The parameter $\theta$ denotes the projection angle for a projection image.

Since the projection operator $\Pi$ is linear, it is easy to invert the operator $\Pi^{-1}$. Given a set of rendered images $\{I(\theta_i); i=1, 2, \ldots\}$, the original volume V can be reconstructed using the inverted operator $\Pi^{-1}$. This inverse process is in principle similar to volumetric image reconstruction, and can be expressed as:

$$V = \Pi^{-1}(\{\theta_i; i32\, 1, 2, \ldots\}). \quad (2)$$

Cinematic volume rendering is based on volumetric path tracing. Rather than integrating observations from a 3D volume on a ray, cinematic volume rendering is performed by integrating over all of the illuminance arriving at a single point on the surface of the object. This illuminance is then reduced by a surface reflectance function to determine how much of the illuminance will go towards the viewpoint camera. This integration procedure is repeated for every pixel in the output 2D projected image. Cinematic volume rendering can be described as volumetric path tracing using a non-linear projection operator $\Omega$ that operates on a 3D volume V, using a camera model with a parameter $\theta$, to generate a 2D image J, such that:

$$J = \Omega(V; \theta). \quad (3)$$

In the rendered image J generated using cinematic volume rendering, noise is largely suppressed and the structures are greatly enhanced.

FIG. 1 shows a comparison of projected images generated using ray tracing volume rendering and cinematic volume rendering. As shown in FIG. 1, image 102 is a projected image generated using ray tracing volume rendering and image 104 is a projected image generated using cinematic volume rendering. As can be seen in FIG. 1, noise is greatly reduced and anatomical structures are enhanced in the projected image 104 generated using cinematic rendering, as compared to the projected image 102 generated using ray tracing volume rendering.

In terms of computation, cinematic volume rendering is more time-consuming than ray tracing volume rendering. Ray tracing volume rendering can be performed in real-time, for example during a surgical procedure guiding by medical images of a patient, while cinematic volume rendering typically cannot be performed in real-time due to its high computational cost.

Figure 2:
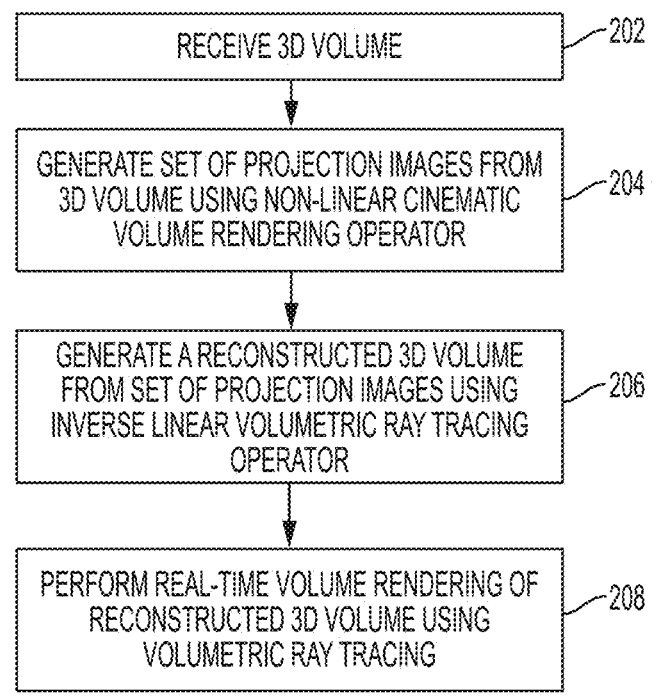
FIG. 2 illustrates a method for volume rendering based 3D image filtering and real-time cinematic volume rendering according to an embodiment of the present invention.

FIG. 2 illustrates a method for volume rendering based 3D image filtering and real-time cinematic volume rendering according to an embodiment of the present invention. The method of FIG. 2 transforms 3D image data, such as medical image data representing a patient's anatomy to suppress noise and enhance structures of interest in the image data and to generate 2D projected images having suppressed noise and enhance image structures from the 3D image data. Referring to FIG. 2, at step 202, a 3D volume is received. The 3D volume can be a 3D medical image volume of a patient acquired using any type of medical imaging modality, such as computed tomography (CT), magnetic resonance imaging (MRI), dynaCT, ultrasound (US), positron emission tomography (PET), etc. The 3D volume can be received directly from an image acquisition device, such as a CT scanner, MRI scanner, etc., or the 3D volume can be received by a 3D volume previously stored in a memory or storage of a computer system.

At step 204, a set of projection images is generated from the 3D volume using a non-linear cinematic rendering operator $\Omega$. In particular, a set of projection images $\{J(\theta_i) = \Omega(V;\theta_i); i=1, 2, \ldots\}$ is generated with different values for projection angle parameter $\theta_i$. This results in a set of 2D projection images generated using cinematic rendering, in which noise is suppressed and structures of interest are enhanced.

At step 206, a reconstructed volume is generated from the set of projection images using an inverse linear volumetric ray tracing operator $\Pi^{-1}$. That is a new volume $V'=\Pi^{-1}(\{J(\theta_i); i=1, 2, \ldots\})$ is estimated by applying the inverse linear volumetric ray tracing operator $\Pi^{-1}$ to the set of projection images $\{J(\theta_i)=\Omega(V;\theta_i); i=1, 2, \ldots\}$ generated using the non-linear cinematic rendering operator $\Omega$, such that:

$$V'=\Pi^{-1}(\{\Omega(V;\theta_i); i=1,2,\ldots\}). \quad (4)$$

In Equation (4), a given volume V is input and a new volume V' is output. Accordingly, steps 204 and 206 can be considered to perform non-linear filtering on the input volume. Because noise is largely suppressed and the structures are greatly enhanced in the rendered cinematic images, the non-linearly filtered volume V' reconstructed from the rendered cinematic images inherits the same characteristics (i.e., suppressed noise and enhanced structures of interest). The filtered volume V' can be output, for example, for example by displaying the filtered volume V' on a display of a computer system.

At step 208, real-time volume rendering of the reconstructed volume is performed using volumetric ray tracing of the reconstructed volume. In particular, the linear volumetric ray tracing operator $\Omega$ is used to perform volume rendering of the reconstructed volume to generate a 2D projected image I, such that:

$$I=\Pi(V';\theta)=\Pi\Pi^{-1}(\{\Omega(V;\theta_i); i=1,2,\ldots\})\approx\Omega(V;\theta)=J. \quad (5)$$

By applying volumetric ray tracing volume rendering to the filtered volume V', the rendered image I will be very close to the cinematic rendered image J from the original volume. In an advantageous embodiment, steps 202, 204, and 206 can be performed prior to a surgical procedure to pre-compute the filtered volume V', and step 208 can be performed in real-time during a surgical procedure for one or more projection angles $\theta$. By pre-computing the filtered volume V', the real-time rendering performed using ray tracing volume rendering can generate 2D a projected image I that is very close to a cinematic rendered image of the original volume for the same projection angle. In this way, the computational bottleneck of cinematic rendering causing non-real-time performance can be eliminated and 2D projection images having cinematic rendering effects of noise suppression and structure enhancement can be generated in real-time.

A 2D projection image resulting from the real-time volume rendering in step 208 can be output, for example, by displaying the 2D projection image on a display of a computer system. The projection image can be displayed in real-time during a surgical procedure to guide a user performing the surgical procedure. Step 208 of FIG. 2 can be repeated to perform real-time volume rendering of the filtered volume V' at a plurality of different projection angles $\theta$. In this case, the 2D projection image generated for each projection angle can be displayed in real-time.

Figure 3:
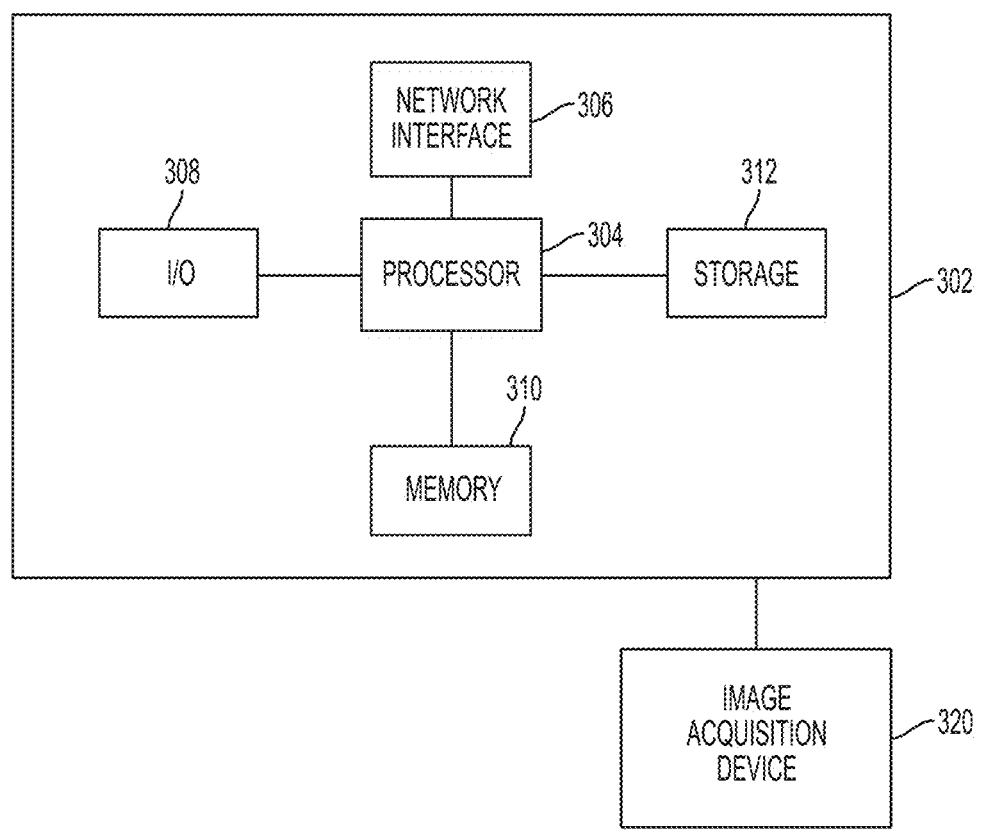
FIG. 3 is a high-level block diagram of a computer capable of implementing the present invention.

The above-described methods for volume rendering based 3D image filtering and real-time cinematic volume rendering may be implemented on a computer using well-known computer processors, memory units, storage devices, computer software, and other components. A high-level block diagram of such a computer is illustrated in FIG. 3. Computer 302 contains a processor 304, which controls the overall operation of the computer 302 by executing computer program instructions which define such operation. The computer program instructions may be stored in a storage device 312 (e.g., magnetic disk) and loaded into memory 310 when execution of the computer program instructions is desired. Thus, the steps of the methods of FIG. 2 may be defined by the computer program instructions stored in the memory 310 and/or storage 312 and controlled by the processor 304 executing the computer program instructions. An image acquisition device 320, such as a CT scanning device, can be connected to the computer 302 to input image data to the computer 302. It is possible to implement the image acquisition device 320 and the computer 302 as one device. It is also possible that the image acquisition device 320 and the computer 302 communicate wirelessly through a network. The computer 302 also includes one or more network interfaces 306 for communicating with other devices via a network. The computer 302 also includes other input/output devices 308 that enable user interaction with the computer 302 (e.g., display, keyboard, mouse, speakers, buttons, etc.). Such input/output devices 308 may be used in conjunction with a set of computer programs as an annotation tool to annotate volumes received from the image acquisition device 320. One skilled in the art will recognize that an implementation of an actual computer could contain other components as well, and that FIG. 3 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for volume rendering based filtering of a 3D volume, comprising:
generating a set of 2D projection images of the 3D volume using cinematic volume rendering; and
generating a reconstructed 3D volume from the set of 2D projection images using an inverse linear volumetric ray tracing operator.

2. The method of claim 1, wherein generating a set of 2D projection images of the 3D volume using cinematic volume rendering comprises:
generating a respective 2D projection image of the 3D volume for each of a plurality of projection angles using cinematic volume rendering.

3. The method of claim 1, wherein generating a set of 2D projection images of the 3D volume using cinematic volume rendering comprises:
generating the set of 2D projection images of the 3D volume using a non-linear cinematic volume rendering operator.

4. The method of claim 3, wherein generating the set of 2D projection images of the 3D volume using a non-linear cinematic volume rendering operator comprises:
generating a respective 2D projection image of the 3D volume for each of a plurality of projection angles using the non-linear cinematic volume rendering operator, wherein the non-linear cinematic volume rendering operator calculates a pixel value for each of a plurality of pixels in each respective 3D projection images by integrating all illuminance arriving at a corresponding point on a surface of the 3D volume and reducing the integrated illuminance by a surface reflectance function.

5. The method of claim 3, wherein generating a reconstructed 3D volume from the set of 2D projection images using an inverse linear volumetric ray tracing operator comprises:
generating the reconstructed 3D volume by applying the inverse linear volumetric ray tracing operator to the set of 2D projection images of the 3D volume generated using the non-linear cinematic volume rendering operator.

6. The method of claim 1, further comprising:
generating a projected 2D image from the reconstructed 3D volume by performing volumetric ray tracing of the reconstructed 3D volume.

7. The method of claim 1, further comprising:
generating a projected 2D image from the reconstructed 3D volume in real-time during a surgical procedure by performing volumetric ray tracing of the reconstructed 3D volume.

8. The method of claim 7, wherein generating the set of 2D projection images and generating the reconstructed 3D volume are performed prior to the surgical procedure.

9. The method of claim 7, wherein the projected 2D image generated from the reconstructed 3D volume is an approximation of a cinematic rendered 2D image from the 3D volume.

10. An apparatus for volume rendering based filtering of a 3D volume, comprising:
means for generating a set of 2D projection images of the 3D volume using cinematic volume rendering; and
means for generating a reconstructed 3D volume from the set of 2D projection images using an inverse linear volumetric ray tracing operator.

11. The apparatus of claim 10, wherein the means for generating a set of 2D projection images of the 3D volume using cinematic volume rendering comprises:
means for generating a respective 2D projection image of the 3D volume for each of a plurality of projection angles using cinematic volume rendering.

12. The apparatus of claim 10, wherein the means for generating a set of 2D projection images of the 3D volume using cinematic volume rendering comprises:
means for generating the set of 2D projection images of the 3D volume using a non-linear cinematic volume rendering operator.

13. The apparatus of claim 12, wherein the means for generating a reconstructed 3D volume from the set of 2D projection images using an inverse linear volumetric ray tracing operator comprises:
means for generating the reconstructed 3D volume by applying the inverse linear volumetric ray tracing operator to the set of 2D projection images of the 3D volume generated using the non-linear cinematic volume rendering operator.

14. The apparatus method of claim 10, further comprising:
means for generating a projected 2D image from the reconstructed 3D volume by performing volumetric ray tracing of the reconstructed 3D volume.

15. The apparatus of claim 14, wherein the projected 2D image generated from the reconstructed 3D volume is an approximation of a cinematic rendered 2D image from the 3D volume.

16. A non-transitory computer readable medium storing computer program instructions for volume rendering based filtering of a 3D volume, the computer program instructions when executed by a processor cause the processor to perform operations comprising:
generating a set of 2D projection images of the 3D volume using cinematic volume rendering; and
generating a reconstructed 3D volume from the set of 2D projection images using an inverse linear volumetric ray tracing operator.

17. The non-transitory computer readable medium of claim 16, wherein generating a set of 2D projection images of the 3D volume using cinematic volume rendering comprises:
generating a respective 2D projection image of the 3D volume for each of a plurality of projection angles using cinematic volume rendering.

18. The non-transitory computer readable medium of claim 16, wherein generating a set of 2D projection images of the 3D volume using cinematic volume rendering comprises:
generating the set of 2D projection images of the 3D volume using a non-linear cinematic volume rendering operator.

19. The non-transitory computer readable medium of claim 18, wherein generating a reconstructed 3D volume from the set of 2D projection images using an inverse linear volumetric ray tracing operator comprises:
generating the reconstructed 3D volume by applying the inverse linear volumetric ray tracing operator to the set of 2D projection images of the 3D volume generated using the non-linear cinematic volume rendering operator.

20. The non-transitory computer readable medium of claim 16, wherein the operations further comprise:
generating a projected 2D image from the reconstructed 3D volume by performing volumetric ray tracing of the reconstructed 3D volume.

21. The non-transitory computer readable medium of claim 16, wherein the operations further comprise:
generating a projected 2D image from the reconstructed 3D volume in real-time during a surgical procedure by performing volumetric ray tracing of the reconstructed 3D volume.

22. The non-transitory computer readable medium of claim 21, wherein the operations of generating the set of 2D projection images and generating the reconstructed 3D volume are performed prior to the surgical procedure.

23. The non-transitory computer readable medium of claim 21, wherein the projected 2D image generated from the reconstructed 3D volume is an approximation of a cinematic rendered 2D image from the 3D volume.

\* \* \* \* \*